3,001,965
CHLOROSULFONATED POLYETHYLENE COMPOSITIONS

James Kalil, Beaumont, Tex., and Kenneth L. Miller, Lyndon, Ky., assignors to E. I. du Pont de Nemours and Company, Wilmington, Del., a corporation of Delaware
No Drawing. Filed Apr. 9, 1959, Ser. No. 805,134
14 Claims. (Cl. 260—28.5)

This invention relates to elastomeric chlorosulfonated polyethylene compositions and more particularly to chlorosulfonated highly linear polyethylene compositions which have improved physical properties that relate to the fabrication thereof into useful articles.

It is known that the elastomeric chlorosulfonated polyethylenes are deficient in tack in the uncured state in comparison to most other elastomers. Such elastomeric materials, when made from highly linear polyethylenes, are particularly deficient in tack and difficult to fabricate into useful articles. When conventional softeners and tackifying agents have been added thereto, the chlorosulfonated polyethylenes become so plastic and so highly tacky at the moderately elevated temperatures associated with milling and compounding operations that they tend to stick to the mill rolls and form a stringy mass whereby they are difficult to handle in the usual equipment and the fabrication of many useful articles therefrom by the usual methods is impossible.

Recently, it has been found that liquid chlorinated paraffin waxes show such excessive softening effects much less than other superficially similar agents but do not entirely eliminate the difficulty.

It is an object of this invention to provide chlorosulfonated highly linear polyethylene compositions having improved physical properties whereby they are more easily fabricated into useful articles. It is another object to provide elastomeric chlorosulfonated highly linear polyethylene compositions which have been softened and have had their tackiness increased to a desirable limited extent. A further object is to provide elastomeric chlorosulfonated highly linear polyethylene compositions containing a chlorinated paraffin wax and in which the chlorosulfonated polyethylene has been modified so that the chlorinated wax has only a desirable limited affect on the physical properties thereof. Other objects are to provide new compositions of matter and to advance the art. Still other objects will appear hereinafter.

The above and other objects may be accomplished in accordance with this invention wherein a chlorosulfonated highly linear polyethylene has been uniformly reacted with a limited proportion of an aliphatic diamine and admixed with a normally liquid chlorinated paraffin wax, whereby there is obtained a curable elastomeric composition comprising a substantially uniform reaction product of a chlorosulfonated highly linear polyethylene and from about 0.0017 to about 0.017 gram mol of an aliphatic diamine for each 100 grams of the chlorosulfonated polyethylene admixed with from about 30% to about 200% by weight of a normally liquid chlorinated paraffin wax; the chlorosulfonated polyethylene containing from about 25% to about 55% by weight of chlorine and from about 0.3% to about 2.0% by weight of sulfur; the polyethylene being highly linear and having a density greater than 0.935 and a melt index between 0.5 and 20; the diamine being a saturated, aliphatic hydrocarbon diamine containing 2 to 20 carbon atoms; and the chlorinated paraffin wax containing from about 15% to about 55% by weight of chlorine.

It has been found that, when a chlorosulfonated highly linear polyethylene of the type above defined, has been reacted with the specified proportion of an aliphatic diamine of the specified class and admixed with the chlorinated paraffin wax, a composition of greatly improved physical properties is obtained. The chlorosulfonated polyethylene product is softened and has a desirable increased tack, but is not rendered excessively plastic or tacky so that it will readily stick to the rolls or other surfaces of the usual processing equipment. Therefore, such compositions are much more easy to handle in such equipment, to compound and cure, and to fabricate into useful elastomeric articles.

The chlorosulfonated polyethylenes are prepared from highly linear polyethylenes having a density greater than 0.935, preferably greater than 0.950 and (as a measure of the molecular weight) with a melt index (see ASTM–D1238–52T) between about 0.5 and 20. Polyethylenes, which do not fall within these limits, are not suitable for use in the compositions of this invention and tend to produce compositions which are too soft and sticky for the purposes of this invention. Suitable polyethylenes of this type are produced by the methods disclosed in Patents 2,762,791, 2,799,668, 2,822,357 and 2,816,883.

The chlorosulfonated polyethylenes employed in this invention are prepared from the aforesaid highly linear polyethylenes by the conventional chlorosulfonation procedures, preferably those disclosed by McAlevy in Patent 2,586,363 and by Ernsberger in Patent 2,503,252. The chlorosulfonated polyethylenes will contain from about 25% to about 55% by weight of chlorine, preferably from about 30% to about 45% by weight of chlorine, and 0.3% to 2.0% by weight of sulfur. Some of such chlorosulfonated highly linear polyethylenes are described by Ralph Otto Heuse in application Serial No. 768,030, filed October 20, 1958, as a continuation-in-part of Serial No. 666,771, filed June 19, 1957, now abandoned.

The diamines which are reacted with the chlorosulfonated highly linear polyethylenes in accordance with this invention are the saturated aliphatic hydrocarbon diamines which contain from 2 to 20 carbon atoms, preferably from 2 to 10 carbon atoms. Such diamines may be acyclic or alicyclic. Such diamines may be represented by the formula $H_2N-A-NH_2$ wherein A represents a saturated divalent hydrocarbon radical containing from 2 to 20 carbon atoms. By saturated is meant free of multiple C—C bonds, such as those in ethylenic, acetylenic and aromatic radicals. Representative diamines of this invention are hexamethylene diamine, ethylene diamine, menthane diamine, propylene diamine, trimethdiamine, decamethylene diamine, cyclohexane diylene diamine, decamethylene diamine, hexadecamethylene amines, dodecamethylene diamine, hexadecamethylene diamine, eicosamethylene diamine. Ethylene diamine, hexamethylene diamine and menthane diamine are particularly preferred.

The amount of the diamine employed should be in the range of from about 0.0017 to 0.017 gram mol for each 100 grams of the chlorosulfonated polyethylene, preferably from about 0.0042 to about 0.0085 gram mol. Materially less than 0.0017 gram mol of diamine fails to produce a practical effect. Materially more than 0.017 gram mol of diamine is objectionable and tends to produce an undesirable nerve and even causes scorching of the elastomeric composition.

It is important that the diamine be uniformly reacted with the chlorosulfonated highly linear polyethylene. The reaction is substantially complete in 5 minutes at 25° C. and is substantially instantaneous at higher temperatures. If the diamine is added to the chlorosulfonated polyethylene by the ordinary mixing method, e.g. on a warm mill, it tends to react before it is well incorporated into the chlorosulfonated polyethylene and hence to give a non-uniform product which is seriously lacking in strength after curing. Therefore, the diamine should be well distributed through the chlorosulfonated polyethylene before reaction takes place so as to avoid reaction of part of the chlorosulfonated polyethylene with a large amount of the diamine, leaving part of the chlorosulfonated polyethylene unreacted with the diamine and hence producing a heterogeneous product in which part of the chlorosulfonated polyethylene is highly cross-linked by the diamine. Suitable methods for producing uniform reaction products are to dissolve or disperse the diamine in the chlorinated wax before mixing the wax with the chlorosulfonated polyethylene, or to add the diamine to a mixture of the chlorosulfonated polyethylene and the chlorinated wax in carbon tetrachloride solution and then isolate the material by evaporating the solvent. The reaction between the diamine and the chlorosulfonated polyethylene may be carried out at a temperature of from 0° C. to about 150° C., preferably from about 20° C. to about 100° C.

The chlorinated wax employed in this invention is a normally liquid product obtained by chlorinating a paraffin wax so that it contains from about 15% to about 55% by weight of chlorine, preferably from about 20% to about 43% by weight of chlorine. By normally liquid is meant that it is liquid at ordinary room temperature. Such liquid chlorinated waxes are obtained from paraffin waxes which melt between about 27° C. and about 69° C., preferably between about 48° C. and about 60° C. Solid products, containing materially higher proportions, of chlorine and obtained from materially higher melting waxes, are not suitable for this invention. Most of the desirable properties of the elastomeric compositions and the cured products thereof, such as tensile strength, elongation, resilience, resistance to permanent set and resistance to scorching showed either broad maxima or plateaus when the chlorinated wax employed contained from about 20% to about 43% chlorine and were obtained from paraffin waxes melting in the range of from about 48° C. to about 60° C., with little or no significant variation in these properties over such ranges. A very desirable and effective chlorinated wax within the preferred range is that employed in the examples hereinafter presented which is a commercial product, sold as "Chlorowax LN," and which had a Brookfield viscosity at 25° C. of 9 poises, a density of 1.13 and a refractive index of 1.4999.

The chlorinated wax should be employed in a proportion of from about 30% to about 200% by weight based on the weight of the chlorosulfonated polyethylene. The best results are obtained when the chlorinated wax is employed in the proportion of from about 50% to about 125% by weight, and such proportions are preferred.

The curable elastomeric compositions of the present invention can be compounded and cured in the manner and by the methods recommended and employed with the various chlorosulfonated polyethylenes of the prior art, including those made from the highly branched as well as the highly linear polyethylenes; that is, in the manner disclosed by McAlevy et al. in Patents 2,416,060 and 2,416,061. Thus, there may be used compounds of divalent metals such as litharge, tribasic lead maleate, and magnesium oxide, which are commonly used for curing assisted by rosin acids and conventional rubber vulcanization accelerators. Organic peroxy compounds, such as those disclosed by Strain in Patent 2,534,078, also may be used for curing these compositions. The chlorosulfonated highly linear polyethylene compositions of this invention may be heavily loaded, when necessary, with carbon black, clay, titanium dioxide, and the like.

In order to more clearly illustrate this invention, preferred modes of carrying it into effect, and advantageous results obtained thereby, the following examples are given, in which the parts and proportions are by weight except where specifically indicated otherwise.

EXAMPLE 1

A linear polyethylene of density 0.96 and melt index 0.9 is chlorosulfonated in carbon tetrachloride solution with chlorine and sulfur dioxide in the presence of a free-radical catalyst so as to contain 44% chlorine and 1.0% sulfur. This product, isolated by evaporating the carbon tetrachloride, is mixed with an equal weight of liquid chlorinated paraffin wax, containing 40% chlorine, in which 0.5 part of hexamethylene diamine per 100 parts of chlorosulfonated polyethylene (0.0042 gram mol per 100 grams) has first been dissolved. The carbon tetrachloride is evaporated by the method described by James Kalil in his U.S. patent application Serial No. 566.166, filed February 17, 1956, now U.S. Patent No. 2,923,979 wherein the solution is applied to the surface of a revolving drum maintained at about 150° C. by internal heating, keeping the material in contact with the drum until less than 3% of carbon tetrachloride remains in the material, and then removing the resulting dried film from the drum.

The resulting product handles with great ease on a rubber mill, having practically no nerve and forming a very smooth sheet which readily adheres to itself but, on the other hand, shows little tendency to stick to the mill rolls (or to the surfaces of a Banbury mixer). It can therefore be easily rolled up and removed from the mill in the form of a "cigar." On the other hand, when no diamine is added, the material sticks to both rolls of the mill, apparently because of a combination of high tack and low strength associated with high plasticity. This product, from chlorosulfonated highly linear polyethylene, hexamethylene diamine, and chlorinated wax, is compounded with 2 parts of diphentamethylene thiuram tetrasulfide, 20 parts of milled litharge, and 50 parts of semi-reinforcing furnace black per 100 parts of chlorosulfonated polyethylene and cured in the form of test slabs for 30 minutes at 153° C. (307° F.). The properties of the uncured and cured stock are shown in Table I presented hereinafter.

EXAMPLE 2

Example 1 is repeated, using 1 part (0.0085 gram mol per 100 grams) of hexamethylene diamine instead of 0.5 part, but otherwise proceeding in exactly the same way. The properties of the uncured and cured products are given in Table I.

EXAMPLE 3

The linear polyethylene used in Example 1 is chlorosulfonated to contain 37% chlorine and 1.2% sulfur and is then mixed, in carbon tetrachloride solution, with 100 parts by weight of liquid chlorinated paraffin wax containing 40% chlorine and 0.28 part of ethylene diamine (0.0047 gram mol per 100 grams). The carbontetrachloride is then removed, using the drum drier described in Example 1. The resulting product has practically no nerve and does not stick to the mill rolls. It is compounded with 2 parts of dipentamethylene thiuram tetrasulfide, 40 parts of sublimed litharge, 50 parts of semi-reinforcing furnace black, 2 parts of nickel dibutyl dithiocarbamate, and 5 parts of disproportionated rosin per 100 parts chlorosulfonated polyethylene and cured for 30 minutes at 153° C. The properties are given in Table I.

EXAMPLE 4

The linear polyethylene used in Example 1 is chlorosulfonated so as to contain 40.5% chlorine and 0.77% sulfur and is then mixed on a mill with an equal weight of liquid chlorinated paraffin wax containing 40% chlorine in which 1 part of menthane diamine (0.0058 gram mol per 100 grams) per 100 parts of the chlorosulfonated polyethylene has first been dissolved. The resulting mixture, which has the good milling properties of the products of the preceding examples, is compounded with one part of dipentamethylene thiuram tetrasulfide, 20 parts of magnesium oxide, and 50 parts of titanium dioxide and cured as in the preceding examples. The properties are given in Table I.

The properties of the compositions of the preceding examples are shown in the following Table I in comparison with two controls, A and B. Control A does not contain any diamine but otherwise was prepared from the same materials in the same proportions and compounded and cured in the same manner as the composition of Example 1. Control B is a commercial chlorosulfonated polyethylene which was similarly compounded and cured in the absence of diamine and chlorinated wax or other plasticizing or tackifying agent.

Table I

| Example | A | 1 | 2 | 3 | 4 | B |
|---|---|---|---|---|---|---|
| Diamine | | hexamethylene | | ethylene | menthane | |
| Amount | | 0.5 | 1.0 | 0.28 | 1.0 | |
| Tack [1] | excel | excel | excel | excel | excel | poor. |
| Nerve | none | none | fair | none | none | fair. |
| Sticking | serious | slight | none | none | none | none. |
| Tensile | 1,150 | 1,700 | 1,575 | 1,700 | 2,000 | 2,300. |
| Modulus (100%) | 40 | 60 | 75 | 150 | 75 | 400. |
| Elongation | 420 | 425 | 340 | 280 | 675 | 350. |
| Set | 6 | 6 | 3 | 2 | 18 | 12. |

[1] "Excel" means excellent.

It will be seen from Table I that three representative aliphatic and alicyclic diamines produce, in blends of chlorinated paraffin waxes and chlorosulfonated polyethylenes containing varying amounts of chlorine and of sulfur, an important improvement in tensile strength and modulus and complete or almost complete elimination of sticking to the mill rolls, without loss of the excellent tack and low nerve contributed by the chlorinated wax, and without significant loss and, in some cases, with important improvement in the other properties measured. The examples further illustrate that these effects take place in various compounding formulas. Figures, included for a commercial chlorosulfonated polyethylene (B) containing no plasticizing or tackifying agent, show that the products of the present invention approach this product in tensile properties, while being greatly superior in milling properties.

It will be understood that the preceding examples have been given for illustrative purposes solely and that this invention is not limited to the specific embodiments described therein. On the other hand, it will be readily apparent to those skilled in the art that, subject to the limitations set forth in the general description, many variations may be made in the materials, proportions, and procedures employed, without departing from the spirit and scope of this invention.

It will be seen from the preceding disclosure that this invention provides novel elastomeric chlorosulfonated highly linear polyethylene compositions of materially improved physical properties. Particularly, the softness and tackiness have been improved without obtaining objectionable excessive softness and tackiness or producing products which stick to the surfaces of processing equipment to a serious extent, and without serious sacrifice of desirable properties in the cured products. Thereby the compositions of this invention can be more easily processed, compounded and cured and particularly can be readily fabricated into useful articles which heretofore were extremely difficult or impossible to fabricate from prior chlorosulfonated polyethylene compositions. Accordingly, it is apparent that this invention constitutes a valuable advance in, and contribution to, the art.

The embodiments of the invention in which an exclusive property or privilege is claimed are defined as follows:

1. A curable elastomeric composition comprising a substantially uniform reaction product of a chlorosulfonated highly linear polyethylene and from about 0.0017 to about 0.017 gram mol of an aliphatic diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 25% to about 55% by weight of chlorine and from about 0.3% to about 2.0% by weight of sulfur; the polyethylene being highly linear and having a density greater than 0.935 and a melt index between 0.5 and 20; the diamine being a saturated, aliphatic hydrocarbon diamine containg 2 to 20 carbon atoms; and the chlorinated paraffin wax containing from about 15% to about 55% by weight of chlorine.

2. A curable elastomeric composition comprising a substantially uniform reaction product of a chlorosulfonated highly linear polyethylene and from about 0.0042 to about 0.0085 gram mol of an aliphatic diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 25% to about 55% by weight of chlorine and from about 0.3% to about 2.0% by weight of sulfur; the polyethylene being highly linear and having a density greater than 0.935 and a melt index between 0.5 and 20; the diamine being a saturated, aliphatic hydrocarbon diamine containing 2 to 20 carbon atoms; and the chlorinated paraffin wax containing from about 15% to about 55% by weight of chlorine.

3. A curable elastomeric composition comprising a substantially uniform reaction product of a chlorosulfonated highly linear polyethylene and from about 0.0042 to about 0.0085 gram mol of an aliphatic diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 25% to about 55% by weight of chlorine and from about 0.3% to about 2.0% by weight of sulfur; the polyethylene being highly linear and having a density greater than 0.935 and a melt index between 0.5 and 20; the diamine being a saturated, aliphatic hydrocarbon diamine containing 2 to 10 carbon atoms; and the chlorinated paraffin wax containing from about 15% to about 55% by weight of chlorine.

4. A curable elastomeric composition comprising a substantially uniform reaction product of a chlorosulfonated highly linear polyethylene and from about 0.0017 to about 0.017 gram mol of an aliphatic diamine for each 100 grams of the chlorosulfonated polyethylene admixed with from about 50% to about 125% by weight of a normally liquid chlorinated paraffin wax based on the weight of the chlorosulfonated polyethylene; the chlorosulfonated polyethylene containing from about 25% to about 55% by weight of chlorine and from about 0.3% to about 2.0% by weight of sulfur; the polyethylene being highly linear and having a density greater than 0.935 and a melt index between 0.5 and 20; the diamine being a saturated, aliphatic hydrocarbon diamine containing 2 to 20 carbon atoms; and the chlorinated paraffin wax containing from about 20% to about 43% by weight of chlorine.

5. A curable elastomeric composition comprising a substantially uniform reaction product of a chlorosulfonated highly linear polyethylene and from about 0.0042 to about 0.0085 gram mol of an aliphatic diamine for each 100 grams of the chlorosulfonated polyethylene admixed with from about 50% to about 125% by weight of a normally liquid chlorinated paraffin wax based on the weight of the chlorosulfonated polyethylene; the chlorosulfonated polyethylene containing from about 25% to about 55% by weight of chlorine and from about 0.3% to about 2.0% by weight of sulfur; the polyethylene being highly linear and having a density greater than 0.935 and a melt index between 0.5 and 20; the diamine being a saturated, aliphatic hydrocarbon diamine containing 2 to 10 carbon atoms; and the chlorinated paraffin wax containing from about 20% to about 43% by weight of chlorine.

6. A curable elastomeric composition comprising a substantially uniform reaction product of a chlorosulfonated highly linear polyethylene and from about 0.0017 to about 0.017 gram mol of an aliphatic diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 30% to about 45% by weight of chlorine and from about 0.3% to about 2.0% by weight of sulfur; the polyethylene being highly linear and having a density greater than 0.950 and a melt index between 0.5 and 20; the diamine being a saturated, aliphatic hydrocarbon diamine containing 2 to 20 carbon atoms; and the chlorinated paraffin wax containing from about 15% to about 55% by weight of chlorine.

7. A curable elastomeric composition comprising a substantially uniform reaction product of a chlorosulfonated highly linear polyethylene and from about 0.0017 to about 0.017 gram mol of an aliphatic diamine for each 100 grams of the chlorosulfonated polyethylene admixed with from about 50% to about 125% by weight of a normally liquid chlorinated paraffin wax based on the weight of the chlorosulfonated polyethylene; the chlorosulfonated polyethylene containing from about 30% to about 45% by weight of chlorine and from about 0.3% to about 2.0% by weight of sulfur; the polyethylene being highly linear and having a density greater than 0.950 and a melt index between 0.5 and 20; the diamine being a saturated, aliphatic hydrocarbon diamine containing 2 to 20 carbon atoms; and the chlorinated paraffin wax containing from about 20% to about 43% by weight of chlorine.

8. A curable elastomeric composition comprising a substantially uniform reaction product of a chlorosulfonated highly linear polyethylene and from about 0.0042 to about 0.0085 gram mol of an aliphatic diamine for each 100 grams of the chlorosulfonated polyethylene admixed with from about 50% to about 125% by weight of a normally liquid chlorinated paraffin wax based on the weight of the chlorosulfonated polyethylene; the chlorosulfonated polyethylene containing from about 30% to about 45% by weight of chlorine and from about 0.3% to about 2.0% by weight of sulfur; the polyethylene being highly linear and having a density greater than 0.950 and a melt index between 0.5 and 20; the diamine being a saturated, aliphatic hydrocarbon diamine containing 2 to 10 carbon atoms; and the chlorinated paraffin wax containing from about 20% to about 43% by weight of chlorine.

9. A curable elastomeric composition comprising a substantially uniform reaction product of a chlorosulfonated highly linear polyethylene and from about 0.0017 to about 0.017 gram mol of hexamethylene diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 25% to about 55% by weight of chlorine and from about 0.3% to about 2.0% by weight of sulfur; the polyethylene being highly linear and having a density greater than 0.935 and a melt index between 0.5 and 20; and the chlorinated paraffin wax containing from about 15% to about 55% by weight of chlorine.

10. A curable elastomeric composition comprising a substantially uniform reaction product of a chlorosulfonated highly linear polyethylene and from about 0.0017 to about 0.017 gram mol of hexamethylene diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 30% to about 45% by weight of chlorine and from about 0.3% to about 2.0% by weight of sulfur; the polyethylene being highly linear and having a density greater than 0.950 and a melt index between 0.5 and 20; and the chlorinated paraffin wax containing from about 15% to about 55% by weight of chlorine.

11. A curable elastomeric composition comprising a substantially uniform reaction product of a chlorosulfonated highly linear polyethylene and from about 0.0017 to about 0.017 gram mol of ethylene diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 25% to about 55% by weight of chlorine and from about 0.3% to about 2.0% by weight of sulfur; the polyethylene being highly linear and having a density greater than 0.935 and a melt index between 0.5 and 20; and the chlorinated paraffin wax containing from about 15% to about 55% by weight of chlorine.

12. A curable elastomeric composition comprising a substantially uniform reaction product of a chlorosulfonated highly linear polyethylene and from about 0.0017 to about 0.017 gram mol of ethylene diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 30% to about 45% by weight of chlorine and from about 0.3% to about 2.0% by weight of sulfur; the polyethylene being highly linear and having a density greater than 0.950 and a melt index between 0.5 and 20; and the chlorinated paraffin wax containing from about 15% to about 55% by weight of chlorine.

13. A curable elastomeric composition comprising a substantially uniform reaction product of a chlorosulfonated highly linear polyethylene and from about 0.0017 to about 0.017 gram mol of menthane diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 25% to about 55% by weight of chlorine and from about 0.3% to about 2.0% by weight of sulfur; the polyethylene being highly linear and having a density greater than 0.935 and a melt index between 0.5 and 20; and the chlorinated paraffin wax containing from about 15% to about 55% by weight of chlorine.

14. A curable elastomeric composition comprising a substantially uniform reaction product of a chlorosulfonated highly linear polyethylene and from about 0.0017 to about 0.017 gram mol of menthane diamine for each 100 grams of the chlorosulfonated polyethylene admixed with from about 30% to about 200% by weight of a normally liquid chlorinated paraffin wax based on the weight of the chlorosulfonated polyethylene; the chlorosulfonated polyethylene containing from about 30% to about 45% by weight of chlorine and from about 0.3% to about 2.0% by weight of sulfur; the polyethylene being highly linear and having a density greater than 0.950 and a melt index between 0.5 and 20; and the chlorinated paraffin wax containing from about 15% to about 55% by weight of chlorine.

References Cited in the file of this patent

UNITED STATES PATENTS

| | | |
|---|---|---|
| 2,421,409 | Brockman et al. | June 3, 1947 |
| 2,469,107 | Dimpfl et al. | May 3, 1949 |
| 2,925,354 | Berardinelli et al. | Feb. 16, 1960 |

OTHER REFERENCES

"Hypalon," Chlorosulfonated Polyethylene, E. I. du Pont de Nemours Company (Polychemicals Department), Wilmington, Delaware, No. X-32 (a), pages 1–16, dated 1952.

Smook et al.: "Industrial and Engineering Chemistry," vol. 45, No. 12 (1953), pages 2731–2737.